May 19, 1964    R. W. MORRIS    3,133,874
PRODUCTION OF THIN FILM METALLIC PATTERNS
Filed Dec. 5, 1960    3 Sheets-Sheet 1
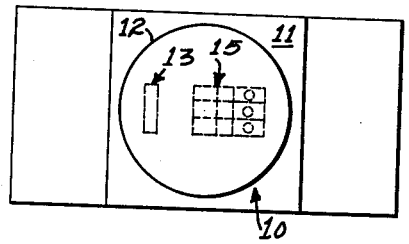
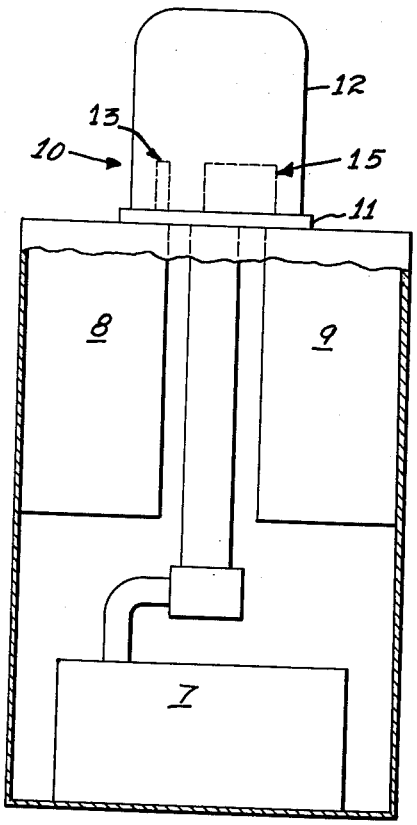
INVENTOR.
Robert W. Morris
BY Wells & St. John
Attys May 19, 1964
R. W. MORRIS
3,133,874
PRODUCTION OF THIN FILM METALLIC PATTERNS
Filed Dec. 5, 1960
3 Sheets-Sheet 2
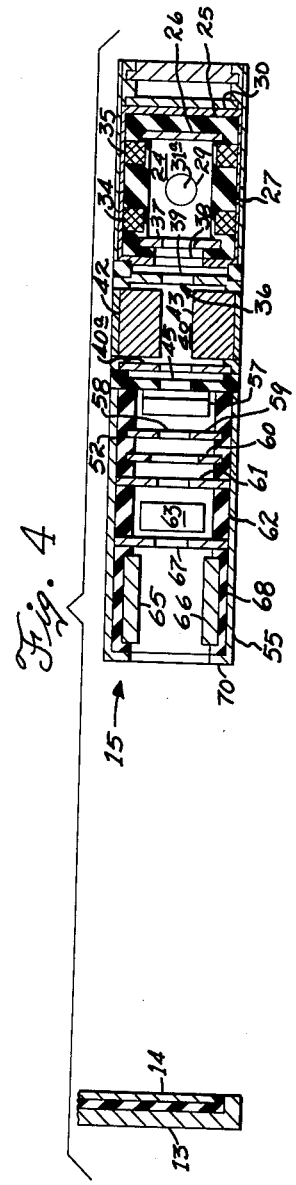
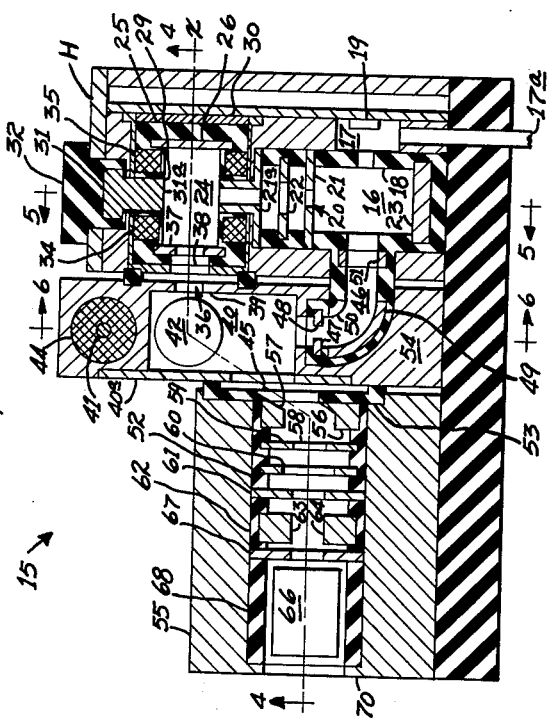
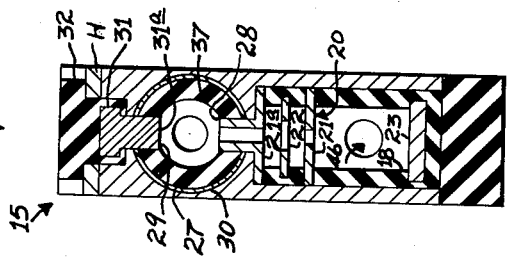
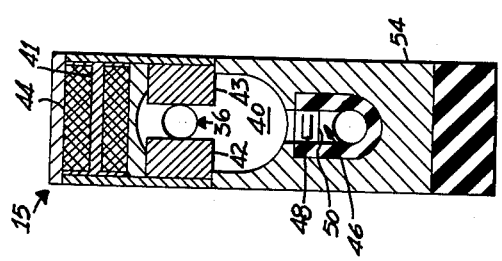
INVENTOR.
Robert W. Morris
BY Wells & St John
Attys.

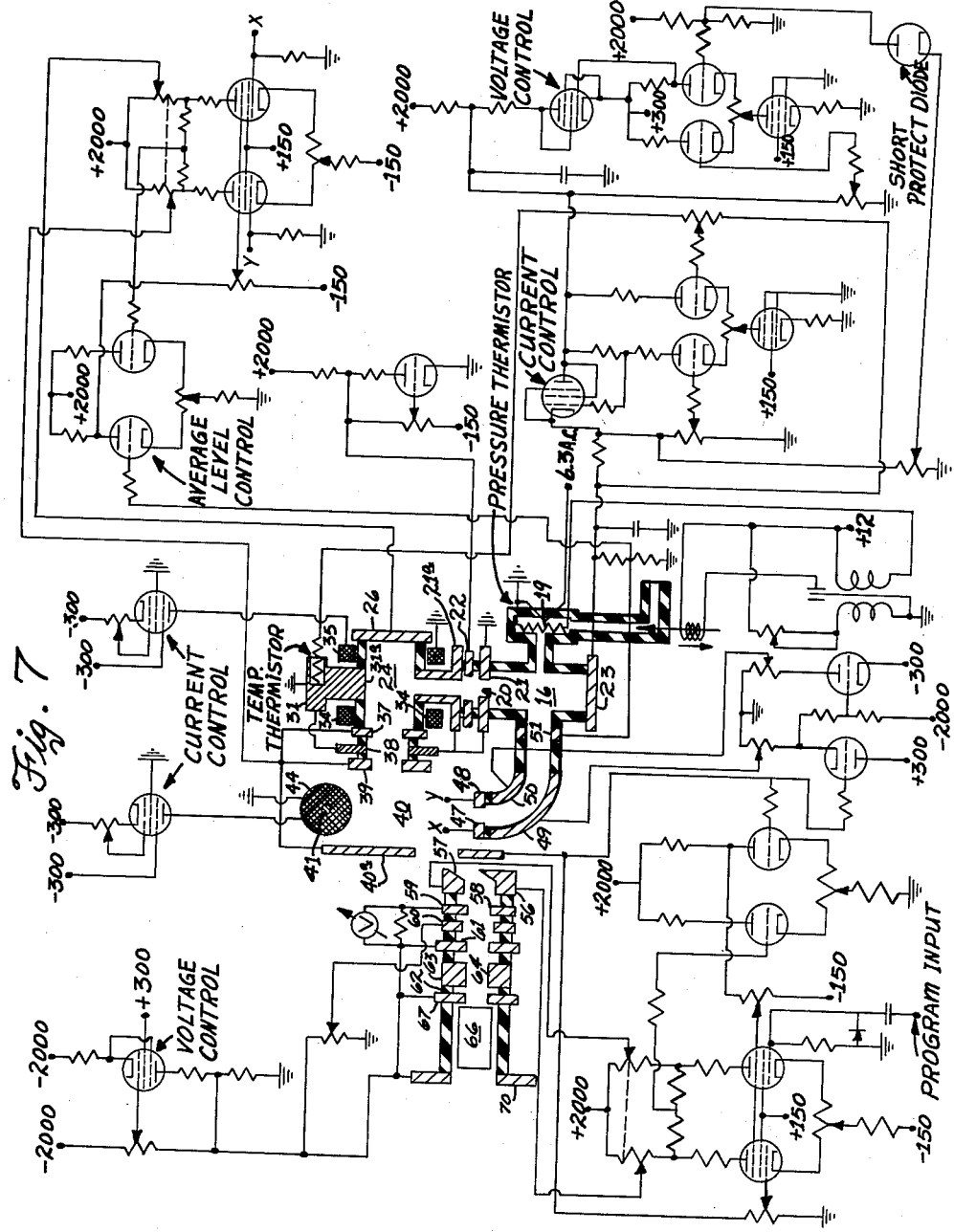

Patented May 19, 1964

3,133,874
PRODUCTION OF THIN FILM METALLIC PATTERNS
Robert W. Morris, Portland, Oreg.
(2612 S. Wall St., Spokane, Wash.)
Filed Dec. 5, 1960, Ser. No. 73,827
4 Claims. (Cl. 204—298)

My invention relates to the production of thin film metallic patterns upon surfaces of other material than the material deposited. The invention is particularly useful in the manufacture of electronic circuits; however, any pattern or picture may be reproduced in various combinations of metallic elements.

It is the purpose of my invention to produce, from a source metallic unit or plate, a beam of metallic ionized particles of controlled composition which can be directed to a target upon which the pattern is to be formed, and to effect purification of the beam that separates the particular ions from those of a different metal or other contaminating substance, while directing the beam to the surface upon which deposition is to be made.

It is a further purpose of my invention to provide a method operable through a beam of inert gas ions to remove metal particles by sputtering from a source plate, to charge or ionize such particles, to direct the ionized particles of metal and gas by electric and magnetic influence so they travel along an axis that is generally parallel to the plate surface, then to deflect the ionized particles, by a magnetic field selectively to remove the inert gas and other ionized particles from the path of the desired metal particles, and then to direct the desired metal particles by electric fields on to a surface in a controlled pattern.

The nature and advantages of my invention will appear more fully from the following description and the accompanying drawings which illustrate a preferred form of the invention. It should be understood, however, that the drawings and description are illustrative only and are not intended to limit the scope of the invention except insofar as it is limited by the claims.

In the drawings:

FIGURE 1 is a somewhat diagrammatic side view of the apparatus used in connection with my invention;

FIGURE 2 is a plan view of the apparatus shown in FIGURE 1;

FIGURE 3 is a sectional view taken on a central vertical plane extending longitudinally through one of the particle producing and directing devices of the apparatus;

FIGURE 4 is a sectional view taken substantially on the line 4—4 of FIGURE 3;

FIGURE 5 is a sectional view taken substantially on the line 5—5 of FIGURE 3;

FIGURE 6 is a sectional view taken on the line 6—6 of FIGURE 3; and

FIGURE 7 is a diagrammatic view showing the various electrical connections to the parts of the particle producing and directing device.

According to my invention the apparatus involved comprises a vacuum chamber 10 comprising a base 11 and a bell jar 12 inverted thereon and sealed thereto. On the base 11 there is a target electrode 13 which is recessed to receive a plate 14 upon the surface of which the deposit of metal particles is to be formed. Customarily the plate 14 is an insulating material. Also on the base 11 there are a plurality of particle ion generating and directing devices 15. Three such devices are shown side by side although more or fewer such devices may be used, depending upon the complexity of the deposit required. Each device 15 is electrically adjusted to deposit particles of a particular metal element upon the surface of the plate 14. The base 11 rests upon a housing which contains an evacuation apparatus 7 for maintaining a suitable low pressure within the bell jar 12. The housing 6 also contains a power pack 8 to supply electricity at the necessary voltages and a control chassis 9 containing the necessary electrical control apparatus to regulate voltages and currents within the devices 15. All electrical and gas connections necessary for the operation of the devices 15 are made through the base 11.

The base plate 11, the target 13 and the bodies of the devices 15 are preferably made of aluminum which I find to be best suited for my purpose. It has the lowest sputtering rate of the common construction metals and is substantially non-magnetic. For electrical insulation I prefer to use an aluminum oxide ceramic and soft iron is used for magnetic cores and shields.

Referring now to FIGURES 3, 4, 5 and 6 of the drawings these figures show the details of construction of the devices 15. Each device 15 has an ionization chamber 16 provided with a port 17 for introduction of gas. This chamber has its shell 18 primarily of electrical insulation but with various metal inserts as will be later described. A vacumm gage 19 is provided at the port 17 and it monitors the pressure in the chamber 16. If the pressure in chamber 16 becomes too low due to action of evacuation pump 7 (below the glow discharge region) then gas is admitted through the inlet conduit 17a to port 17. The entire area around the devices 15 is kept below the glow discharge region by the apparatus 7. The gas leaves chamber 16 as ions produced by the voltage difference between electrodes 21 and 23.

Above the chamber 16 there is an electron lens assembly 20 comprising grounded ring electrodes 21 and 21a, and a focusing ring electrode 22. The bottom of the chamber 16 is closed by the electrode 23. As will be described more fully later, the chamber 16 is supplied with a suitable gas (one of the noble gases such as argon or neon) and a potential of proper polarity is established between electrodes 21 and 23 to form and direct positive ions of the gas through the lens assembly into a sputtering chamber 24.

The sputtering chamber 24 has a rear plate 25 of insulation in which an electrode 26 is mounted. In front of the plate 25 is a sleeve 27 of insulation which has a top opening 29 and a bottom opening 28. The bottom opening 28 leads to the electron lens assembly 20, the upper element of which is grounded to a soft iron shield 30, which surrounds the insulation sleeve 27 and the plate 25. The sleeve 27 receives a block 31 in its top opening 29. This block is made up of the metal to be used and it is carried by a plug 32 of insulation and rests on the main housing section H. The block 31 has a reduced portion 31a that extends through the shield 30 and the opening 29 so that the beam of positive ions of gas from the lens 20 impinges directly on it. The action of the gas ions is to cause particles of the metal of the block 31 to sputter off and fly out into the sputtering chamber 24.

The sputtering metal particles are ionized by the same gas ion beam. In order to direct these ionized particles of metal I provide an electric and a magnetic field in the sputtering chamber 24. Electromagnet windings 34 and 35 are mounted around the sleeve 27 so as to produce a magnetic field on the X axis indicated in the drawings. This tends to concentrate the ionized metal particles in the chamber 24 on the X axis as viewed in FIGURE 3 of the drawings. I provide a potential difference between the electrode 26 in the plate 25 and electrode 37 of lens 36 across the chamber 24 from electrode 26 to accelerate the metal and gas ions toward the lens 36 so they will be directed through the lens 36 into a magnetic field that is transverse to the X axis. The voltage across the chamber 24 between the electrodes 26 and 37 provides the initial acceleration of the ionized particles to the left as viewed in FIGURE 3.

The lens 36 composed of ring 37 at a potential more negative than the average value of chamber 16, an intermediate grounded ring 38 and a third ring 39 that is at the potential of ring 37. The function of these rings is to accelerate and focus the flow of ionized gas and metal particles leaving the chamber 24. The magnetic field produced by the coils 34 and 35 tends to compress the stream of ionized particles flowing to the left (FIGURE 3) under the influence of the voltage between the electrodes 26 and 37.

The gas and metal particles flowing through the lens 36 enter a separating chamber 40. This entire chamber is at the potential of ring 37. In the sides there are terminal faces 42 and 43 of a U-shaped core 41 which has a coil 44 thereon to set up a magnetic field between the faces 42 and 43. The ionized particles from the lens 36 are deflected more or less according to their mass as they cross this magnetic field between the faces 42 and 43. The lighter mass particles will be deflected the most. I take advantage of this characteristic to separate the desired metal particles from the ionized gas and from any undesired particles that may be in the stream of ionized particles issuing from the lens 36. An aperture 45 is provided in the wall of the chamber 40 most remote from the lens 36. A gas outlet passage 46 is provided in the bottom of the chamber 40 and is continued along a curved path to the ionizing chamber 16. This passage 46 is lined with insulation as shown in the drawings. It also has control electrodes 47, 48 therein close to the chamber 40, deflecting electrodes 49, 50 therein to deflect the gas ions 90 degrees and a ring electrode 51 near the chamber 16 to decelerate the gas ions so they will have the same potential as the midpoint of chamber 16 and again be sent through the lens assembly 20. This closed loop is at higher pressure than the rest of the system.

The metal particles that pass through the aperture 45 are those to be deposited upon the target plate 14. Particles of greater mass will not be deflected as much in the magnetic field between the faces 42 and 43 and thus will strike the wall 40a above the aperture 45. Particles of less mass than the desired particles will be deflected more by the magnetic field and strike the wall 40a below the aperture 45 or, if light enough, be deflected into or in back of the outlet passage 46.

Mounted on the wall 40a are a tube 52 and a flanged member 53 of insulation. An aluminum section 55 surrounds the tube 52 and holds 52 and 53. The tube 52 and section 55 carry the means by which the particles entering the tube 52 through the aperture 45 are directed to the proper spot of the target plate 14.

When the particles of the desired mass enter the tube 52 they are subjected to an electrical field between electrode plates 56 and 57 which are mounted within the tube 52. The voltage applied across these plates 56, 57 is such as to apply a field in the upward direction sufficient to cancel the deflection of the particles from horizontal by the magnetic field in the chamber 40. With a specific setting of the voltage at plates 56, 57 only particles of a small mass range will pass out along the tube 52 toward the target plate 40. A third lens 58 is provided in the sleeve 55 at the end of the tube 52. This lens 58 comprises electrode rings 59, 60 and 61. The ring 61 is formed in the sleeve 55. The insulation tube 52 carries the electrode rings 59 and 60. An insulation tube 62 abuts the ring 61. This lens 58 focuses and accelerates the beam of selected metal particles toward the target plate 14.

Control of the vertical location in which the particles will be deposited upon the target plate 14 is effected by an electrical field between a top plate electrode 63 and a bottom plate electrode 64 in the tube 62. For horizontal deflection of the beam of particles an electrical field is provided between horizontal spaced plate electrodes 65 and 66. There is a shield ring 67 of aluminum in the section 55 abutting the tube 62. A tube 68 of insulation carries the electrodes 65 and 66 and abuts the ring 67.

The section 55 has an end flange 70 against which the tube 68 is placed. It should be noted that the sleeve 55 is completely insulated from the grounded body of the device and it is at the potential of the rings 59, and 67.

It is well known that when a high voltage is applied between two electrodes separated by a gas at a relatively low pressure the residual gas within the space between the electrodes is ionized and the particles move according to the polarity of the end plates. Thus if electrode 23 is highly positive with respect to the metal disk 31 the positive ions of gas will travel toward the disk 31 and strike it. Upon impact the kinetic energy of the gas ion is transferred to the metal. If the gas ions have enough energy, neutral metal atoms are sputtered from the metal surface and fly off into the chamber 24. These particles do collide with other on-coming gas ions and thus become ionized. The compression field, a magnetic field generated by the windings 34, 35, operates to constrict the ionized metal particles as well as any other ionized particles present in the chamber 24 and keep them inward away from the chamber walls. The magnetic field applies a centripetal force to the ionized metal particles and concentrates them along the axial center line through the coils 34, 35. Thus a concentration or beam of ionized particles is set up within the chamber 24.

Now, in order to get the ionized particles of gas and metal or other substance that may be present in the disk 31 out of the chamber 24 and moving in the desired direction, a voltage gradient must be established across the chamber 24 from right to left as viewed in FIGURE 3. Therefore, electrode 26 is made positive with respect to the electrical midpoint of chamber 16 and electrode 37 and the ionized positive charged particles accelerate toward the lens 36, being held in a concentrated beam by the magnetic field. The electrode ring 38 is more negative than the electrode rings 37 and 39 of the lens 36 to give focusing at the center of faces 42 and 43. The electrical midpoints of chambers 16 and 24 are the same so that gas ions passing back through 46 will arrive at 16 with zero velocity and midpoint potential.

When the beam of ionized particles, including gas particles, metal particles, and particles of impurities that may have been in the disk, reaches the magnetic field between the faces 42, 43 in the chamber 40 they are deflected downward by this field. The amount of deflection varies, depending upon the mass and velocity of the ionized particles. Those particles of smallest mass are deflected the most. Thus the gas particles being lighter are deflected downward into the passage 46 provided the velocity of the particles and the strength of the magnetic field are in proper proportion. Likewise the aperture 45 is so located that the desired metal particles are deflected just enough by the magnetic field to pass through the aperture 45. The geometry is set for use with argon. Other particles of different mass strike the wall 40a of the chamber 40 and thus are removed from the gas and from the desired metal particles.

Referring now to FIGURE 7 showing the electrical connections, the control voltages and their connections will be described. The rings 21 and 21a of the lens assembly 20, the shield 30, the ring 38 of the lens assembly 36, and the metal element 31 are at ground potential. The voltages applied to the ring 22, and 60 control focus only and standard voltage regulator circuits are used for their generation.

The voltage applied to electrode 23 determines the ion generation. It is a positive voltage. The voltages applied to the ring electrodes 59, 61, 67 and 70 and to the target plate holder 13, determine the acceleration of the ionized particles toward the target 14 after they have passed the tube 52. The voltages applied to the electrodes 63, 64 and to the electrodes 65, 66 determine the amount of deflection of the beam of ionized particles. The voltages applied to electrodes 59, 61, 67, 70 and 13 are derived from known electronic voltage regulators with manual adjustment. To obtain the deflection voltages for the electrodes 63, 64 and 65, 66 the master pattern or design is scanned and a sweep voltage generator is used to obtain the deflection voltages. The currents for the two magnetic fields 34, 35 and 42, 43 are obtained from constant current regulators and adjusted manually.

The voltages applied to the electrodes 26, 37, 49, 50 and 56, 57 are obtained automatically from a control voltage that exists across the electrodes 47, 48 in the following manner. Initially the current in the coil for the magnetic field 42, 43 is pre-set to provide a magnetic field of the desired intensity (in the order of 5,000 gauss). Then the voltage applied between electrodes 26 and 37 is brought positive to a value such that the gas ions (neon, argon) entering the chamber 40 from the lens 36 are at the right velocity to be deflected 90 degrees by the magnetic field 42, 43. From this point on the voltage between electrodes 26 and 37 is controlled automatically by the voltage differential across the electrodes 47 and 48. If any increase occurs in the magnetic field 42, 43 to cause the gas ions to be deflected more than 90 degrees than the electrode 48 will become more negative than the electrode 47 and this will increase the voltage between electrodes 26 and 37 thus increasing the velocity of the particles approaching the field 42, 43. If the magnetic field 42, 43 decreases then more gas ions will strike the electrode 47 making it more negative than electrode 48 and this will decrease the voltage between electrodes 26 and 37, thereby decreasing the velocity of the particles approaching the field 42, 43. This feed back control serves to stabilize the angle at which the ionized metal particles leave the magnetic field 42, 43 and pass through the aperture 45. Since this angle is kept substantially constant, by virtue of the feed back control just described, the ratio of horizontal velocity toward the target to downward velocity of the metallic ions that have passed through the aperture 45 is directly responsive to the voltage between electrodes 26 and 37. Therefore, the voltage applied to the electrodes 56, 57 can be made directly proportional to the voltage applied between electrodes 26 and 37, and controlled by this last named voltage to remove the downward component of velocity imparted to the particles passing through the aperture 45 by the field 42, 43. The voltage necessary on the electrodes 49, 50 is also proportional to the voltage applied to the electrode 26 by the same reasoning that applies to the voltage across electrodes 56—57. When properly adjusted the voltage across electrodes 49—50 will deflect the gas ions 90 degrees from the vertical to send them horizontally toward the chamber 16. Here the ring 51 with a positive voltage approximately one-half that on the electrode 23 correspondingly reduces the gas ion velocity to zero as they re-enter the chamber 16.

The operation is as follows: A suitable high positive voltage is applied to the electrode 23. With the electrode 21 of the lens 20 at ground potential, and with argon gas pressure in the chamber 16 at slightly above the glow discharge region, positive gas ions of argon are formed and attracted through the lens 20 into the sputtering chamber 24. The inner ring 22 of the lens 20 is adjusted in voltage to focus the gas ion beam on the face of the metallic element 31 that is exposed through the openings 28 and 29 of the sleeve 27. The element 31 is bombarded by the positive ions of gas and atoms of the metal are sputtered off. A thermistor unit T mounted in the element 31 is used in controlling the ion beam current. The current through chamber 16 is used to hold the mass 31 at a constant temperature by feed back from the thermistor to the current control tube. The sputtered metal atoms fly off the element 31 in various directions and are ionized by collision with the gas ions in the chamber 24.

The magnetic field generated by the windings 34 and 35 acts to concentrate the gas ions and ionized metal atoms along the horizontal axis of these windings and to thus keep the particles in position for direction out of chamber 24 along the X axis. To move the ionized particles out of the chamber 24 a positive voltage is applied between electrode 26 and electrode rings 37 and 39. Lens ring 38 is at ground potential. Thus an electrostatic field is established along the X axis, accelerating the ionized gas and metal atoms from the chamber 24 along the X axis into the chamber 40. In order to concentrate the stream of ionized gas and metal atoms the middle ring 38 of the lens 36 is at a substantially lower voltage than that applied to the electrodes 37 and 39. The concentrated stream of ionized gas and metal atoms is thus made to enter the magnetic field across 42—43 which is transverse to the X axis. As they pass through the magnetic field 42—43 the ionized atoms are deflected according to their mass. Atoms of greater mass are deflected less than those of less mass. The gas atoms being of least mass are deflected the greatest amount. The magnetic field 42—43 and the electrostatic field between the electrode 26 and 37 are adjusted so that deflection of the ionized atoms gas is 90 degrees downward to direct them into the opening 46' between electrodes 47 and 48. For a particular metal desired the aperture 45 is positioned so that when the gas atoms are deflected 90 degrees the metal atoms will be deflected at a lesser angle to pass through the aperture 45. Ionized particles in the stream having masses higher or lower than that of the metal desired will be deflected at a different angle and thus will not pass through the aperture 45. In this way I am able to separate the metal and impurities that may be in the block 31.

The ionized metal atoms that pass through the aperture 45 must be realigned with the axis of tube 52. This is accomplished by setting up an electrostatic field across the electrode plates 56—57 that will deflect the ionized metal atoms upward into the lens 58. The lens 58 concentrates the ionized metal atoms along the axis of the tube section 62 and they are thereafter focused on the target 14 by the electrical fields across the vertical deflection control electrodes 63 and 64 and the horizontal deflection electrodes 65 and 66. These fields are varied in intensity by a scanning device which scans a master pattern and applies the scanning signal thus obtained to control the fields. When the metal atoms from a plurality of the devices are being applied to a common target it is a simple matter to cut off the flow of atoms from one of the devices. This is done by cutting off the field across 56—57 so that the beam of atoms passing through the slit 45 is not deflected upward. The atoms will then strike the forward ring 59 of the lens 58 which is metered in order to determine output.

It will be noted that the aluminum block around the tube 52, the lens rings 59 and 61 and the members 67 and 70 are all at the same potential which is a negative potential below the potentials of the purification on generating sections. The potential applied to the holder 13 of the target 14 is negative with respect to this potential and these relative potentials control the acceleration of the ionized metal particles toward the target 14.

While the particular gas employed may be any one of several it is essential that the gas be substantially inert with respect to metal which is to be deposited and of such nature that it is inert to the insulation and metals used in the construction of the device. The term inert gas wherever used herein is intended to include any gas fitting the above definition. I find the noble gases, neon and argon are good examples of desirable gases to use. The gas pressure around the devices 15 preferably is kept below the glow discharge region of the order of 3 mm. Hg by evacuation apparatus 7. This pressure exists, of course, substantially throughout the focus and deflection region within the tube 55. The pressure within the chambers 40, 24 and 16 is kept slightly higher so as to be within the glow region. Due to the recirculation of gas from the chamber 40 to the chamber 16 by electromagnetic action this higher pressure is possible. If the vacuum gage 19 indicates the pressure in chamber 16 is too low then more gas is added at the port inlet 17a. In this way the pressure in the chambers 40, 24, and 16 is kept in the glow discharge region while the pressure surrounding the devices 15 is slightly below the glow discharge region.

If any other heavier atomic or molecular gas or vapor is injected with an inert gas (helium in this case) into chamber 16 with voltage on 23 off, and 31 is made of aluminum, these gases will be ionized in chamber 24 and proceed in all other respects like the metallic ions striking the target 14 where desired, if it is desired, to alter the composition of metallic films on target. Therefore not only metallic ion but many other ion beams can be produced and controlled.

It is believed that from the foregoing description, the nature and advantages of my invention will be clear to those skilled in the art.

Having thus described my invention, I claim:

1. A device for depositing thin film metal patterns upon a solid surface comprising:
   a gas filled ionization chamber;
   a positively charged electrode having a face exposed in said chamber;
   a gas ion concentrating lens across the chamber from said electrode, the potential of the lens being negative with respect to the electrode;
   a sputter chamber into which the lens opens;
   a block containing the metal to be deposited, having a metallic face positioned in said sputter chamber across the chamber from the lens in alignment with the lens axis;
   means operable to establish a cylindrical magnetic field in said sputter chamber having a magnetic axis perpendicular to and intersecting the lens axis, whereby ionized metal and gas particles will be concentrated along the magnetic axis, said sputter chamber including an outlet opening on said magnetic axis;
   an ion concentrating lens in said outlet opening;
   means operable to establish an electrostatic field along said magnetic axis adapted to accelerate ionized gas and metal particles toward and through said outlet opening;
   an enclosed separating chamber located outwardly adjacent said outlet opening and having an inlet in communication therewith;
   means in said separating chamber operable to establish a magnetic field intercepting and deflecting the stream of ionized particles as they leave said outlet opening;
   a first outlet aperture in the wall of said separating chamber opposite its inlet adapted to admit ionized metal particles deflected by said last named magnetic field;
   a second outlet aperture angularly offset from the first named aperture in the wall of said separating chamber positioned to receive ionized gas particles deflected by said last named magnetic field;
   means located outwardly adjacent to said first outlet aperture adapted to receive, align and accelerate metal particles passed through said first outlet aperture;
   and recirculating means outwardly adjacent to said second outlet aperture and opening in communication between said separating chamber and said ionization chamber adapted to direct ionized gas particles passed through said second outlet aperture to said ionization chamber.

2. In a device for providing a stream of ionized metal particles;
   a gas ionizing chamber;
   a sputter chamber;
   gas ionizing means located in said gas ionizing chamber;
   means connecting said chambers adapted to direct a stream of ionized gas particles across said sputter chamber from the gas ionizing chamber;
   a source of the desired metal particles located in said sputter chamber positioned in the path of the stream of ionized gas particles whereby metal particles are sputtered from said source into the sputter chamber and ionized;
   means to concentrate the ionized particles within the sputter chamber along an axis transverse to the direction of said stream of ionized gas particles;
   an outlet passage provided in said sputter chamber on said axis;
   means to discharge the ionized particles from the sputter chamber through the outlet passage;
   a purification chamber opening to said sputter chamber through the outlet passage;
   a magnetic field applied within said purification chamber adapted to deflect the ionized gas particles emerging from said sputter chamber at a greater angle than the ionized metal particles are deflected;
   means opening to said purification chamber adapted to receive the deflected ionized gas particles to direct said particles to the gas ionizing chamber and to decelerate them to their original state;
   and means opening to said purification chamber adapted to receive the deflected ionized metal particles to align the particles in a single stream and to accelerate the stream to the desired exit velocity.

3. The invention defined in claim 2 wherein said means to concentrate the ionized particles comprises electromagnetic means around the sputter chamber.

4. In a device for providing a stream of ionized metal for deposit upon a surface:
   a gas ionizing chamber;
   a sputter chamber having a source of the metal particles exposed therein;
   means to direct ionized gas particles from the gas ionizing chamber against said source thereby to sputter the metal from said source;
   a purification chamber opening onto said sputter chamber;
   means to discharge the sputtered metal and gas particles in a stream from said sputter chamber into the purification chamber;
   means creating a magnetic field in said purification chamber transverse to the stream of ionized metal and gas particles thereby to effect separation of the particles by magnetic deflection according to their mass;
   an outlet slit in the purification chamber adapted to admit the desired metal particles after deflection;
   means located outwardly of the slit adapted to concentrate and accelerate the stream of metal particles admitted therethrough;
   an outlet opening in the purification chamber adapted to admit the gas particles after deflection;
   and means located outwardly of the outlet opening adapted to return the admitted gas particles to the gas ionizing chamber.

References Cited in the file of this patent

UNITED STATES PATENTS

| | | |
|---|---|---|
| 2,146,025 | Penning | Feb. 7, 1939 |
| 2,239,642 | Burkhardt | Apr. 22, 1941 |
| 2,463,180 | Johnson | Mar. 1, 1949 |
| 2,636,855 | Schwarz | Apr. 28, 1953 |
| 2,754,259 | Robinson | July 10, 1956 |
| 2,772,363 | Robinson | Nov. 27, 1956 |
| 2,947,868 | Herzog | Aug. 2, 1960 |
| 2,975,278 | Brubaker | Mar. 14, 1961 |